(12) United States Patent
White et al.

(10) Patent No.: US 7,166,812 B2
(45) Date of Patent: Jan. 23, 2007

(54) HOUSING FOR A KEY FOB

(75) Inventors: Jeffrey A. White, Belleville, MI (US); John Burca, Rochester Hills, MI (US); Robert Wegrzyn, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/028,082

(22) Filed: Jan. 3, 2005

(65) Prior Publication Data

US 2006/0144683 A1    Jul. 6, 2006

(51) Int. Cl.
*H01H 13/14*    (2006.01)

(52) U.S. Cl. .................. 200/341; 200/293; 70/403; 70/395

(58) Field of Classification Search ........ 200/293–296, 200/341; 70/403, 408, 405, 395–399
See application file for complete search history.

(56) References Cited

U.S. PATENT DOCUMENTS

| | | | |
|---|---|---|---|
| 4,888,970 A | 12/1989 | Kinzler et al. | |
| 5,768,925 A | 6/1998 | Ozawa et al. | |
| 5,819,568 A * | 10/1998 | Christie et al. | ........... 70/395 |
| 6,016,676 A | 1/2000 | McConnell | |
| 6,035,677 A | 3/2000 | Janssen et al. | |
| 6,216,501 B1 * | 4/2001 | Marquardt et al. | ........... 70/252 |
| 6,433,728 B1 * | 8/2002 | Krupp et al. | ........... 341/176 |
| 6,460,386 B1 * | 10/2002 | Watanuki et al. | ......... 70/456 R |
| 6,462,291 B1 * | 10/2002 | Sachs | ................. 200/302.2 |
| 6,545,629 B1 * | 4/2003 | Johnson et al. | ........... 341/176 |
| 6,669,017 B1 * | 12/2003 | Linihan | ................. 206/305 |
| 6,691,539 B1 | 2/2004 | Jacob et al. | |
| 6,765,311 B1 * | 7/2004 | Labonde | ................. 307/10.1 |
| 2002/0067245 A1 | 6/2002 | Campbell et al. | |
| 2004/0085251 A1 | 5/2004 | Shimura | |
| 2004/0099430 A1 | 5/2004 | Scudder | |

FOREIGN PATENT DOCUMENTS

| | | |
|---|---|---|
| GB | 2 319 803 A | 3/1998 |
| JP | 2001 182389 A | 7/2001 |
| JP | 2001 200664 A | 7/2001 |

* cited by examiner

*Primary Examiner*—Richard K. Lee
(74) *Attorney, Agent, or Firm*—MacMillan, Sobanski & Todd, LLC

(57) ABSTRACT

A remote keyless entry device for use with a vehicle that includes a printed circuit board, at least one button configured to cooperate with the printed circuit board to selectively form an electrical circuit, a power source, and a housing. The printed circuit board and the power source are embedded within the housing. The housing at least partially covers the button and secures the button to the printed circuit board.

8 Claims, 4 Drawing Sheets

HOUSING FOR A KEY FOB

BACKGROUND OF THE INVENTION

This invention relates in general to a vehicle keyless entry device (key fob) and in particular to a key fob having an improved structural design and better durability at a reduced cost.

Keyless entry systems utilizing transmitters (key fobs) are known convenience features for many modern vehicles to allow a user remote access to the vehicle. Such devices are typically used for vehicle locking and unlocking, door and trunk opening and closing, opening windows, and to sound an alarm or activate a panic feature, or any other electronically controllable vehicle feature. Keyless entry systems usually have a wireless portable transmitter with a built in antenna unit for use in establishing communication with the vehicle. Therefore, key fobs commonly operate through the use of radio frequency signal transmission.

Due to the expanded use of key fobs, the key fob design must function consistently throughout extended periods of operation. They must also be robust enough to sustain exposure to punishing environments such as weather, impacts due to dropping, contact with other items in a purse or pocket, and contact with the steering column of a vehicle. Therefore, conventional key fobs require sealing the transmitter, electronics, and battery supply within the key fob housing.

Commonly, key fobs are made of a plastic housing which include an integral loop formed therein. The loop serves the purpose of retaining a separate key ring for retaining a plurality of keys. Most conventional key fob housings are formed as multi-piece hard plastic clam shell enclosure containing a printed circuit board (PCB) and at least one elastomeric switch therein. The clam shell enclosure is typically formed separately and then assembled with the PCB and switch. Due to the multi-piece design, a sealing mechanism is also used to prevent water and other contaminants from entering and damaging the internal electronics of the key fob.

Therefore, it would be desirable to have a remote keyless entry device for a vehicle with an improved structure and design that minimizes the disadvantages of conventional key fobs.

SUMMARY OF THE INVENTION

This invention relates to a remote keyless entry device for use with a vehicle. The keyless entry device includes a printed circuit board, at least one button, a power source, and a housing. The button is configured to cooperate with the printed circuit board to selectively form an electrical circuit. The printed circuit board and the power source are embedded within the housing. The housing at least partially covers the button and secures the button to the printed circuit board.

This invention also relates to a method of forming a remote keyless entry device. The steps of the method include providing a tool defining a mold cavity therein, providing a printed circuit board, providing at least one elastomeric button, positioning the printed circuit board and the button within the mold cavity, using a low pressure over molding process to insert a molding material into the mold cavity to embed the printed circuit board therein and at least partially cover the button, curing the molding material, and removing the formed remote keyless entry device from the tool.

This invention also relates to a remote keyless entry device that includes a printed circuit board, at least one button, and a single piece housing. The button is configured to cooperate with the printed circuit board to form an electrical circuit.

The button is selectively operable to form the electrical circuit. The single-piece housing is configured to secure the button to the housing, such that the printed circuit board is embedded within the housing.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Remote keyless entry devices, commonly referred to as key fobs, are known in the art. Such devices typically include buttons that are operable to control various features of the vehicle remote keyless entry system of the vehicle. Key fobs can also include a key ring for attaching a larger key ring or keys thereto. In some designs a key for the vehicle can be integrated into the key fob. In such a design a key shank is typically mounted directly to the key fob such that the key shank and key fob are a single piece. An exemplary key fob design is illustrated in U.S. Patent Publication 2004/0099430 A1.

Figure 1:
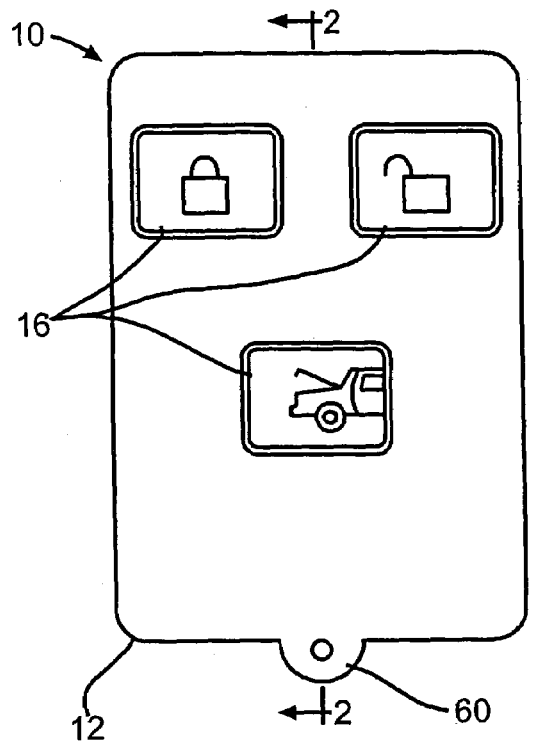
FIG. 1 is a plan view of a remote keyless entry device according to the present invention.
Figure 2:
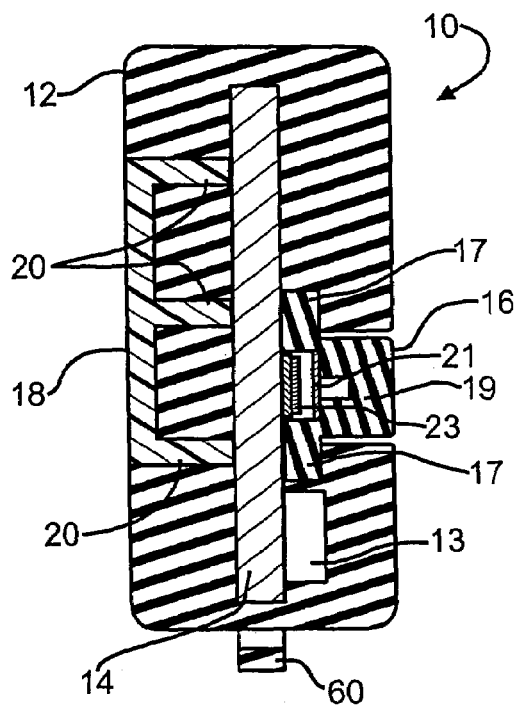
FIG. 2 is a sectional view of the remote keyless entry device of FIG. 1 through Line 2—2.

Referring now to the drawings, there is illustrated in FIGS. 1 and 2 a key fob 10 including a housing 12 into which remote keyless entry circuitry formed on a printed circuit board (PCB) 14 and corresponding user activatable buttons 16 are mounted. The PCB 14 is preferably embedded within the housing 12. The circuitry can be formed on the PCB 14 using known methods. The housing 12 secures the buttons 16 to the PCB 14 while there can be features on the PCB 14 that facilitate locating the buttons 16 thereon prior to the molding operation. The corresponding buttons 16 are preferably formed as elastomeric switches. These components are generally known in the art. As is also known, the PCB 14 generates signals to activate a remote keyless entry system (not shown) in the vehicle based upon input from the buttons 16 activated by the user.

The basic operation of the buttons 16 is generally known in the art. Specifically, each button 16 shown in FIG. 2 includes at least one contact pad 21 molded or connected to the button 16. It should be appreciated that the button 16 may be any switch apparatus having a contact pad 21 that is movable from a disengaged position in which the contact pad 21 is spaced apart from a corresponding contact 23 on the PCB 14 as shown in FIG. 2, to an engaged position in which the contact pad 21 contacts the corresponding contact 23 of the PCB 14. The contact pad 21 preferably remains in the disengaged position until the button 16 is actuated to move the contact pad 21 into the engaged position due to the button 16 being made of a resilient material. Therefore, when the button 16 is depressed, it automatically returns to the disengaged position upon release. The contact pad 21 of the button 16 may be a contact dome of a dome or membrane switch, although such is not required. The button 16 is preferably formed as an elastomeric pad that may also form the housing that supports the contact pad 21. Thus, the button 16 may have any conventional switch housing adapted to support the contact pad 21. The contact pad 21, as shown, is positioned above the PCB 14 that has a circuit grid (not shown). The button 16 may also be disposed on a subpanel (i.e. substrate, back cover, etc.) that provides physical support to the button 16. To actuate the button 16, a user depresses the button 16. The portion of the button 16 that is depressed moves the contact pad 21 towards the PCB 14. The contact pad 21 contacts the PCB 14 at the corresponding contact 23 to complete an electrical circuit. The contact pad 21 contacting the PCB 14 can provide tactile feel to the button 16. The electrical connection causes a signal to be emitted and that is subsequently received by a receiver in the vehicle. The receiver then processes the received signal to operate the desired vehicle function. Although a plurality of buttons 16 are shown on the key fob 10, it can be appreciated that any number of buttons 16 can be included on the key fob 10 to control a plurality of vehicle functions. As is also shown, and as is known in the art, the buttons 16 can include indicia that identifies the function of each button 16.

As shown in FIG. 1, and more clearly in the sectional representation of FIG. 1 in FIG. 2, the housing 12 of the key fob 10 is formed as a single piece by using a low pressure over-molding process. As seen in FIG. 2, the PCB 14 is securely held within the housing 12. It is preferred that the PCB 14 is substantially covered by, and further preferably is embedded within, the housing 12 so that the PCB 14 is not exposed to the elements. The buttons 16 are also retained with the housing 12. To achieve such a retention, each button 16 preferably includes a skirt 17 that extend laterally from a body portion 19 of the button 16. Thus, during the molding process, the molding material is allowed to flow over the skirt 17 so that the button 16 can be retained with the housing 12. Although the buttons 16 are retained with the housing, it is further preferred that the elastomeric buttons 16 are capable of movement relative to the housing 12 so that when depressed, a portion of the buttons 16 move into contact with the PCB 14 to complete the electrical circuit, thereby transmitting the desired signal from the key fob 10, as was described above.

Also illustrated in FIG. 2 a support plate 18 having a plurality of arms 20 that extend generally perpendicularly from the plate 18 is shown. The arms 20 of the plate 18 are preferably spaced about the plate 18 so that the arms 20 can act to support the PCB 14 during the molding process, as will be described in greater detail below. In the preferred embodiment, the plate 18 is located on the opposite side of the housing 12 than the buttons 16. A battery 13 or other power source can be incorporated within the housing 12 to power the key fob 10. Therefore, the battery would be positioned adjacent, or connected to, the PCB 14 prior to the over-molding process being performed. It can be appreciated that the battery could be a one-time use battery, a rechargeable battery, another type of regenerative power source, or any other suitable power source.

Figure 3:
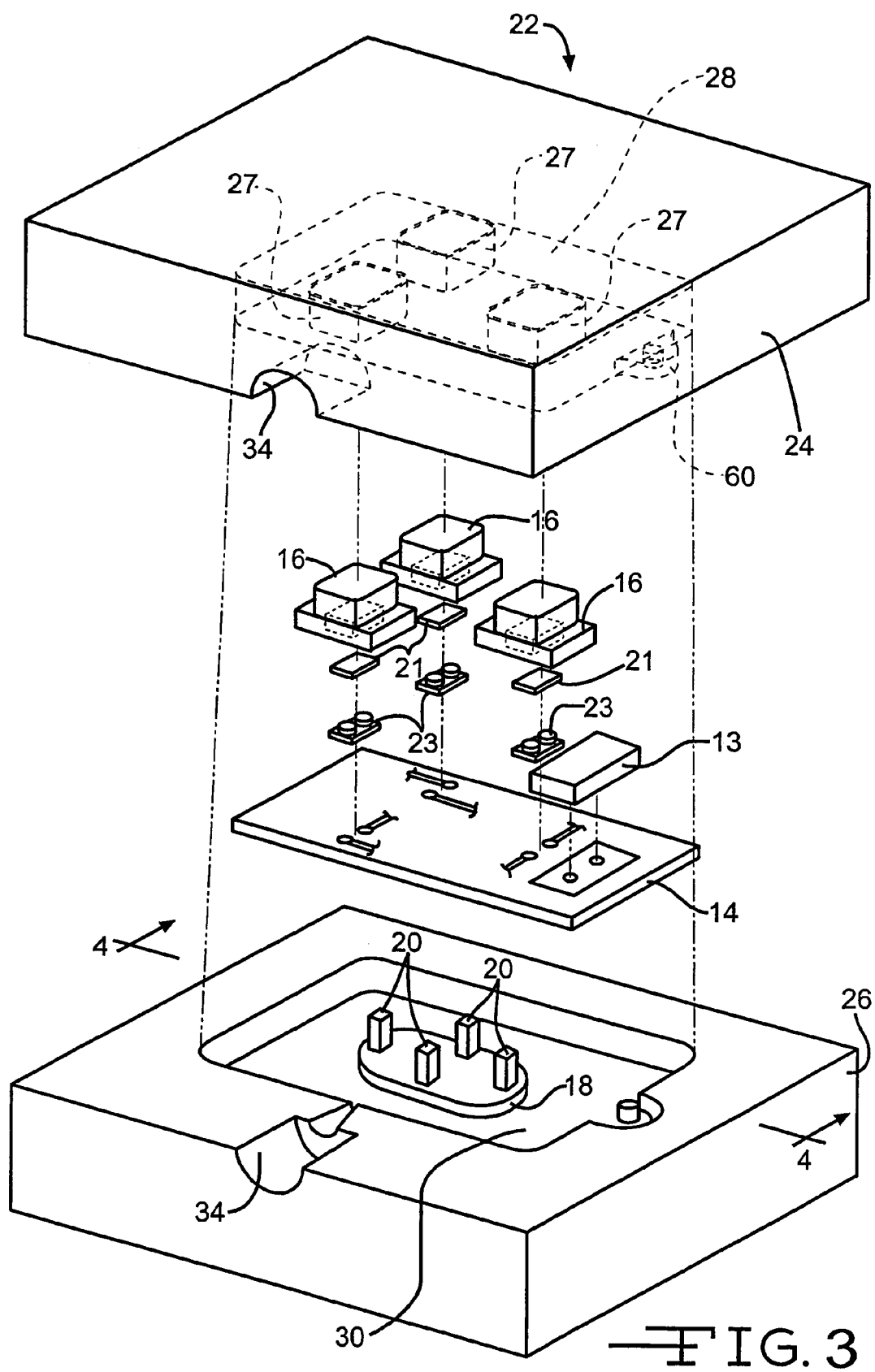
FIG. 3 is an exploded perspective view of a remote keyless entry device molding apparatus including the components of the device according to the present invention.

Referring now to FIG. 3, there is shown an exploded perspective view of a molding apparatus or forming tool, indicated generally at 22, that is used to form the key fob 10, and more particularly to form the housing 12 thereof. The forming tool 22 includes an upper portion 24 having an upper cavity portion 28, and a lower portion 26 having a lower cavity portion 30. The upper portion 24 and the lower portion 26 are movable such that when placed in an abutting arrangement, the upper cavity portion 28 and the lower cavity portion 30 are aligned to define a mold cavity 32. The mold cavity 32 is preferably sized to accommodate the components of the key fob (e.g. the PCB 14, the buttons 16, the support plate 18, and battery 13). The mold cavity 32 also substantially conforms to the desired shape of the completed key fob 10. A channel 34 is preferably formed within the forming tool 22 that allows the molding material (not shown) to be supplied into the mold cavity 32 after the forming tool 22 is assembled. The channel 34 can be formed in either the upper portion 24 of the tool 22, the lower portion 26 of the tool 22, or formed as a split channel with half the channel 34 being formed in each of the upper and lower tool portions 24, 26 (as is shown in FIG. 3). Alternatively, the channel 34 can be formed in any suitable manner that allows the molding material to enter the mold cavity 32. In the preferred embodiment, the molding material used to form the housing 12 is a thermal plastic or a thermal set. However, it should be appreciated that any suitable material used with low pressure over-molding processes can be used to form the key fob 10 according to the present invention such as high performance adhesive materials including hot melt.

A low pressure over molding process, also known as hot melt molding or electro-molding, is the preferred method of forming the key fob 10 according to the present invention due to certain characteristics that result during and by the use of such a process. The use of a high pressure injection molding process is not preferred since such a process could damage the elastomer of the buttons 16 as well as the PCB 14 since such a process is done at a higher pressure (on the order of thousands of p.s.i.) and generally at a higher temperature. Injection molding processes are known to be used to form separate key fob housing halves which are then assembled with PCBs and buttons to form a conventional key fob with a two-piece housing. The housing formed by this method is typically a hard plastic housing. Injection molding is a method for manufacturing plastic parts that involves taking plastic in the form of pellets or granules and heating the material until a melt is obtained. Then the melt is forced into a split-die chamber or mold where it is allowed to cool or cure into the desired shape. The mold is then opened and the part is ejected, at which time the cycle is repeated again.

Due to the low injection pressure of the molding material, over-molding can be performed on the components of the key fob 10 that do not respond well to the high injection pressures ad temperatures of traditional injection molding. Typical pressures for a low pressure molding process are in the range of approximately 30 to 300 p.s.i. and further preferably between 60 to 300 p.s.i. Additionally, typically temperatures for the low pressure molding process are in the range of from 190 to 230° C. (370 to 450° F.) for the melt reservoir temperature. Depending on the mold-set design, this would typically correspond to cavity temperatures of 135 to 180° C. (275 to 355° F.). The housing that is formed as a result of this process typically has a softer, rubbery, feel than the housings formed using the high pressure injection molding process. Using the low pressure over molding process with the components shown here, there is a reduced likelihood of damage to or shifting of components when using low-viscosity polyamides such as thermal plastics and thermosetting resin materials. Additionally, a low pressure over molding process is a more efficient process in that the time needed to cure the formed housing 12 with the PCB 14 and buttons 16 is reduced. Also, since no separate parts are needed after completion of the molding process (such as with high pressure molded parts), the time needed to assemble separate components is substantially reduced or eliminated. Forming the housing 12 about the components as an integrated unit by the low pressure over molding process according to the invention also creates a environment-proof key fob that substantially prevents the entry of contaminants, dirt, and fluids from entering the housing 12 and damaging the components therein.

Referring again to the forming tool 22 in FIG. 3, the low pressure over molding process used in conjunction with the method of forming the key fob according to the present invention will be described next. Preliminarily, a PCB 14 and buttons 16 that are suitable for use in the desired key fob design are selected. Next, a support plate 18 is provided and the PCB 14 is positioned so as to be supported by the arms 20 of the support plate 18. The PCB 14 or the arms 20 can include locating features that properly position the components together. It is preferred that the support plate 18 is positioned adjacent one of the surfaces of the mold cavity 32 such that when the PCB 14 is positioned atop the arms 20 the PCB 14 is spaced away from the surface of the mold cavity 32 (and further preferably within the middle of the mold cavity 32). Thus, the PCB will be substantially centrally positioned within the housing 12 once the housing 12 is formed. The buttons 16 are positioned on the PCB 14 prior to forming the housing 12. The buttons 16 are preferably positioned to correspond to locations on the PCB 14 where the contact pads 21 of the buttons 16 can create a circuit with the contacts 23 to actuate the programmed function of the button 16. The PCB 14 can also include detents or ridges (not shown) formed thereon that can facilitate the positioning of the buttons 16 on the PCB 14 prior to the molding operation. Once the support plate 18, the PCB 14, and the buttons 16 are properly positioned, the forming tool 22 is closed. The molding material is then introduced into the mold cavity 32 under a low pressure according to typical low pressure over-molding techniques.

Typical injection cycles are dependent on the size and material section thickness of the component that is to be formed. Typical cycle times range from 15 to 45 seconds. There are also numerous injection profiles that can be used. A typical profile would consist of filling 90% of the volume into the cavity at relatively high flow rate and then packing at low pressure. Packing pressures are typically from 50 to 150 p.s.i. and such pressures will not over-pack a cavity. Packing helps to prevent sink and voids since the molding material can shrink when it transitions from a liquid phase to a solid.

The upper portion 24 of the tool 22 and the lower portion 26 of the tool 22 are separated after the molded material has cured. To facilitate curing, chilled water can be run through the mold portions 24, 26. The mold-sets are then cooled via the water-cooled mold portion. Typical mold temperature is around 20° C. (68° F.). The formed component, the key fob 10, with the components embedded therein, is then removed from the mold cavity 32 of the tool 22. In a preferred embodiment, the support plate 18 will be secured with the housing 14 and at least partially embedded therein. It is further preferred that the outer surface of the support plate 18 have formed thereon, or be configured to receive, a logo or nameplate of the vehicle for which the key fob 10 is to be used. Alternatively, other identifying indicia could be placed on the face of the support plate 18 as desired.

Figure 4:
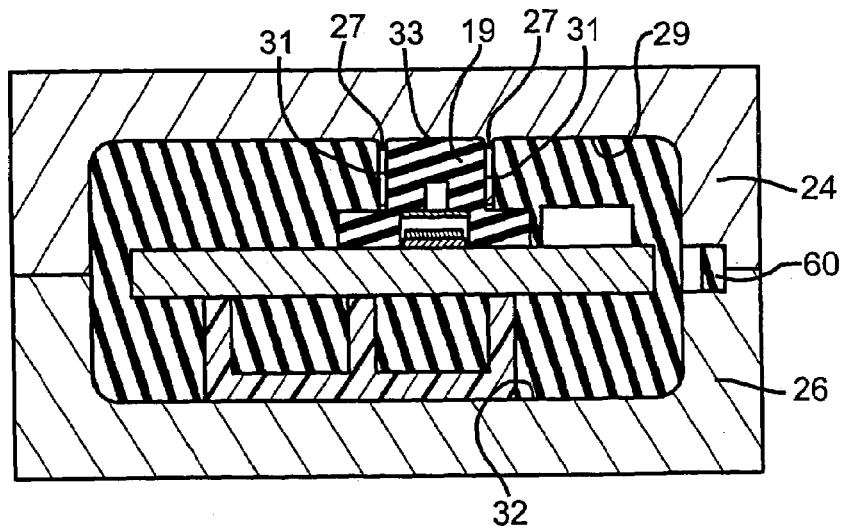
FIG. 4 is sectional view of the molding apparatus and the remote keyless entry device formed therein according to the present invention.

Illustrated in FIG. 4, there is shown a sectional view through the assembled tool 22 with the housing 12 and the components embedded therein. As described above, the PCB 14 is generally centrally positioned within the mold cavity 32 so that the molding material that is used to form the housing 12 substantially surrounds the PCB 14. Also seen are the buttons 16, the support plate 18 and the contact pad 21 and contact 23. As can also be seen, formed on the inner surface 29 of the upper tool portion 24 is a downwardly extending projection 27. It is preferred that the projection 27 substantially encircle part of the body portion 19 of the button to prevent the mold material from attaching to the entire side of the button 16. Alternatively, an upper portion of the button can be recessed into the surface of the upper portion 24 of the tool 22 so that at least a portion of the sides of the button are not in contact with the molding material during the molding process. Although a portion of the sides 31 of the button 16 will be attached to the housing 12, it is preferred that the center portion 33 of the button 16 can elastically deform to bring the contact pad 21 into contact with the contact 23. By attaching a portion of the sides 31 of the button 16 to the housing 12, the button 16 is further secured to the housing 12 to retain the button 16 therewith.

Figures 5, 6:
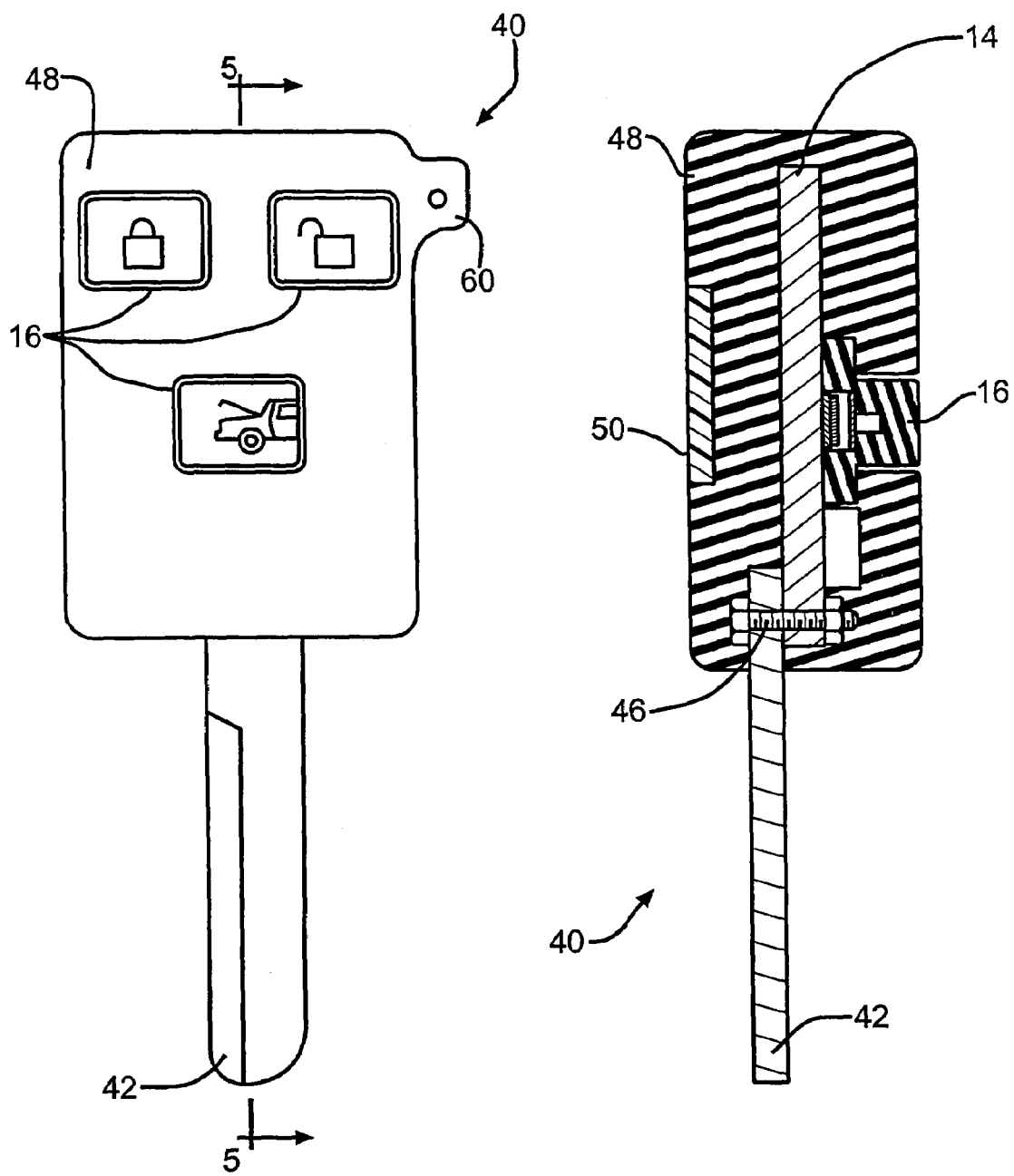
FIG. 5 is a plan view of a remote keyless entry device formed integrally with a key shank according to the present invention.
FIG. 6 is a sectional view of the remote keyless entry device of FIG. 4 through Line 6—6.

There is illustrated in FIGS. 5 and 6 an alternate embodiment of a remote keyless entry device, indicated generally at 40, according to the present invention. In the illustrated embodiment, the key fob 40 is integrated with a key shank or key portion 42. The key portion 42 is similar to a conventional vehicle key in that it can be used to manually lock and unlock the doors and/or trunk of the vehicle, and can also be used to actuate the ignition of the vehicle. As shown in the sectional view of the key fob 40 shown in FIG. 5, the key portion 42 can be fastened with the PCB 14. As shown, the key portion 42 is secured to the PCB 14 using a rivet 46. However, it should be appreciated that any suitable fastening device or mechanism could be used. As with the key fob 10 described above, a plurality of buttons 16 can be formed with the integrated key fob 40 illustrated in FIGS. 5 and 6. The structure and operation of the key fob 40 is substantially the same as the key fob 10 described above excepting the key portion 42.

Figure 7:
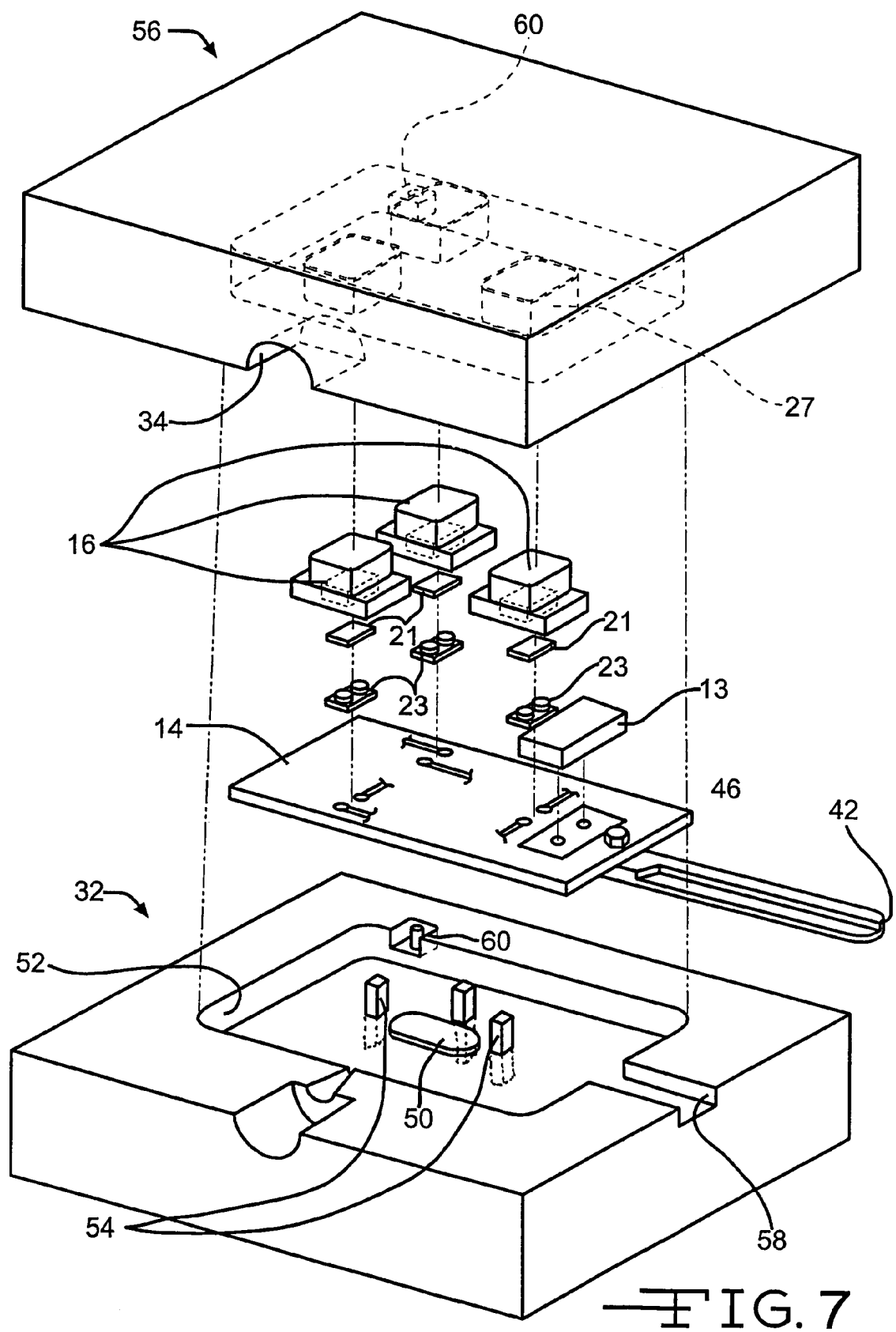
FIG. 7 is an exploded perspective view of a remote keyless entry device molding apparatus including the components of the device according to the present invention.

A forming tool 56 used to form the key fob 40 is shown in FIG. 7. The tool 56 is substantially similar to that which is shown in FIG. 3. However, in this embodiment, it is preferred that an additional recess 58 be formed on the tool 56 that is shaped to accommodate at least a part of the key portion 42. During the molding process, the key portion 42 that is connected to the PCB 14 can act to support the PCB 14 in the proper position. As stated and shown above, it is preferred that the PCB 14 be positioned substantially in the center of the mold cavity 32. It is preferred that only part of the key portion 42 is positioned within the mold cavity 52. Therefore, the majority of the key portion 42 will not be covered by the molding material during the molding process. When the molding process is completed, the key portion 42 will remain secured and integrated with the housing 48 since a portion of the key portion 42 will be embedded in the housing 48. This also solves some of the problems of conventional two-piece key fob housings in that key portions are known to torque relative to the two-piece housing sometimes causing the two-pieces of the conventional key fobs to crack, break the PCB, or separate the housing halves. Since the key fob 40, according to the present invention, is formed as a single piece, the solid mass will be better equipped to withstand the forces applied when key portion 42 is used (i.e. when torque is applied when the key engages a lock or the vehicle ignition and is turned).

In the embodiment of the forming tool 56 shown in the exploded view illustrated in FIG. 7, the support plate 18 and the corresponding arms 20 are not used. In this embodiment, a plurality of prongs 54 are formed on a surface of the tool 56 within the mold cavity 52 such that the PCB 14 is supported directly by the tool 56 prior to the over molding process being performed. Once the formed key fob 40 is removed from the tool 56, the holes that remain where the prongs 54 had extended into the housing 48, can be filled by plugs. The plugs can then be covered by an overlay, decal or a plate 50 that depicts a logo or other identifying indicia if so desired. Alternatively, the prongs 42 could be retractable into the tool 56 during the molding process (shown in phantom in FIG. 7). Therefore, once the PCB 14 is partially secured by the molding material during the molding process, the prongs 54 are retracted and the molding material flows to fill the holes that are left by the retracted prongs 54. Using such a mechanism, the PCB 14 is supported initially by the prongs 54 and then by the molding material as it cures. As shown in FIG. 6, a flat plate 50 is fixed with the housing 48 of the key fob 40. The plate 50 can be positioned within the mold cavity 52 prior to the molding process, positioned adjacent the housing 48 during the curing portion of the molding process, or affixed to the housing 48 after the curing process by an adhesive. With the embodiment of the key fob 40 implementing the plate 50, the PCB 14 is preferably maintained in place throughout the molding process using one of the alternate mechanisms such as the tool prongs 54, described above. Alternatively, the PCB 14 could be held in place by the key portion 42 that is supported by the tool 56 as can be seen in FIG. 6. It should be appreciated that either key fob 10 or key fob 40 can be formed using either the support plate 18 or prong 54 support mechanism to support the PCB during the molding process. Additionally, the key portion 42 supporting the PCB 14 can also be used in addition to either the support plate 18 or prong 54 support mechanism. It should be appreciated that instead of the plate 50, a logo could be formed on the surface of the tool so that an impression of the logo is made on the key fob during the molding process.

It should be appreciated that either key fob 10 or key fob 40 can be made to include other features normally associated with keys and with key chains. For example, the key fobs 10 and 40 can include tabs 60 that are configured to receive a key ring, or allow the key fob 10 and 40 to be attached to a key ring (not shown). The tabs 60 can be configured to have any suitable position on the key fob 10 and 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A remote keyless entry device for use with a vehicle comprising:
    a printed circuit board;
    at least one button that cooperates with the printed circuit board;
    a power source connected to the printed circuit board to form a remote keyless entry device; and
    a housing that is molded about the printed circuit board, a portion of the at least one button, and the power source such that the printed circuit board and the power source are embedded within the housing and the at least one button is at least partially covered by the housing.

2. The device defined in claim 1 wherein the printed circuit board includes a transmitter.

3. The device defined in claim 1 further comprising a key portion that is at least partially embedded within the housing.

4. The device defined in claim 1 further comprising a support plate that is engaged with the printed circuit board, and wherein the housing is molded about at least a portion of the support plate.

5. The device defined in claim 1 further comprising a plurality of buttons that are each configured to cooperate with the printed circuit board to form an electrical circuit.

6. The device defined in claim 1 wherein the button is secured to the printed circuit board by the housing.

7. The device defined in claim 6 wherein the button is an elastomeric button.

8. The device defined in claim 1 wherein the housing is molded from a rubbery material.

* * * * *